(12) United States Patent
Woias et al.

(10) Patent No.: US 8,958,139 B2
(45) Date of Patent: Feb. 17, 2015

(54) THERMO-PNEUMATIC ACTUATOR AND METHOD FOR PRODUCING SAME

(75) Inventors: Peter Woias, Freiburg (DE); Till Huesgen, Stein (CH)

(73) Assignee: Albert-Ludwigs-Universität Freiburg (DE)

( * ) Notice: Subject to any disclaimer, the term of this patent is extended or adjusted under 35 U.S.C. 154(b) by 312 days.

(21) Appl. No.: 13/265,600

(22) PCT Filed: Apr. 22, 2010

(86) PCT No.: PCT/EP2010/002475
§ 371 (c)(1),
(2), (4) Date: Jan. 16, 2012

(87) PCT Pub. No.: WO2010/121813
PCT Pub. Date: Oct. 28, 2010

(65) Prior Publication Data
US 2012/0113497 A1    May 10, 2012

(30) Foreign Application Priority Data

Apr. 23, 2009 (DE) .......................... 10 2009 018 365

(51) Int. Cl.
*G02F 1/01* (2006.01)
*F16K 99/00* (2006.01)

(52) U.S. Cl.
CPC ......... *F16K 99/0001* (2013.01); *F16K 99/0015* (2013.01); *F16K 99/0044* (2013.01); *F16K 2099/0069* (2013.01); *F16K 2099/008* (2013.01)
USPC .............................................. 359/288; 251/11

(58) Field of Classification Search
CPC .................. F16K 2099/0069; F16K 2099/008; F16K 99/0001; F16K 99/0015; F16K 99/0044
USPC ...................... 359/298, 199.1; 29/622; 251/11
See application file for complete search history.

(56) References Cited

U.S. PATENT DOCUMENTS

| 4,821,997 A | 4/1989 | Zdeblick |
| 4,824,073 A | 4/1989 | Zdeblick |

(Continued)

FOREIGN PATENT DOCUMENTS

| DE | 102006006706 A1 | 8/2007 |
| DE | 102006017482 A1 | 10/2007 |

(Continued)

OTHER PUBLICATIONS

Bhansali et al., "Selective seeding of copper films on polyimide-patterned silicon substrate, using ion implantation," Sensors and Actuators, 1996, pp. 126-131, A 52, Elsevier Science S.A.

(Continued)

*Primary Examiner* — Thomas K Pham
*Assistant Examiner* — Vipin Patel
(74) *Attorney, Agent, or Firm* — The Webb Law Firm

(57) ABSTRACT

The invention relates to a thermo-pneumatic actuator having a cavity defined by walls and being hermetically sealed, which is inflated with a working medium that alters the gas pressure thereof when a temperature change occurs. A wall region of the cavity is constructed as a ductile membrane, which can be deflected in at least two working positions located on both sides of a neutral position, in which the membrane is curved in opposite directions to one another. In order to alter the gas pressure in the cavity, and to adjust the membrane from one working position to the other working position, a tempering device is heat-conductively connected to the working medium. In the neutral position, the membrane is compressively loaded such that respectively, it maintains its position in both working positions if no outside force impacts the membrane.

11 Claims, 6 Drawing Sheets

(56) References Cited

U.S. PATENT DOCUMENTS

| | | | |
|---|---|---|---|
| 4,943,032 A * | 7/1990 | Zdeblick | 251/11 |
| 5,074,629 A * | 12/1991 | Zdeblick | 385/14 |
| 5,659,171 A * | 8/1997 | Young et al. | 250/289 |
| 6,149,123 A | 11/2000 | Harris et al. | |
| 7,302,970 B2 | 12/2007 | Sugioka et al. | |
| 7,332,130 B2 * | 2/2008 | Handique | 422/503 |
| 2002/0096222 A1 | 7/2002 | Ueno et al. | |
| 2004/0032000 A1 * | 2/2004 | Ma | 257/415 |
| 2005/0211301 A1 | 9/2005 | Harris et al. | |
| 2005/0284526 A1 | 12/2005 | Welle | |
| 2008/0129795 A1 * | 6/2008 | McAvoy et al. | 347/61 |
| 2008/0236668 A1 | 10/2008 | Beerling et al. | |

FOREIGN PATENT DOCUMENTS

| | | |
|---|---|---|
| EP | 0261972 B1 | 12/1992 |
| EP | 0928371 B1 | 1/2004 |
| WO | 2004025128 A1 | 3/2004 |

OTHER PUBLICATIONS

Lee et al., "Thermal stress analysis for polyimide thin film: The effect of solvent evaporation," Macromolecular Theory and Simulations, 2000, pp. 281-286, 9, Wiley-VCH Verlag GmbH, Weinheim, Germany.

* cited by examiner

THERMO-PNEUMATIC ACTUATOR AND METHOD FOR PRODUCING SAME

BACKGROUND OF THE INVENTION

1) Field of the Invention

The invention relates to a thermo-pneumatic actuator comprising a cavity defined by walls and being hermetically sealed, which is inflated with a working medium that alters its gas pressure when a temperature change occurs, wherein a wall region of the cavity is constructed as a ductile membrane, which can be deflected in at least two working positions located on both sides of a neutral position, in which the membrane is curved in opposite directions to one another, and further comprising a tempering device that is heat-conductively connected to the working medium in order to alter the gas pressure in the cavity and to adjust the membrane from one working position to the other working position. The invention further relates to a method for producing a thermo-pneumatic actuator.

2) Discussion of the Prior Art

U.S. Pat. No. 6,149,123 discloses such an actuator. It comprises a substrate plate with a cavity formed in the surface thereof. Arranged on the substrate plate is a cover layer that overlaps the cavity. The cover layer is hermetically sealed with the rim area of the substrate plate surrounding the cavity. The cavity is inflated with a working medium comprising a gas phase, the gas pressure thereof being temperature-dependent. A wall area of the cavity opposite the cover layer is configured as a thin ductile membrane that can be deflected from a neutral position into at least two working positions located on both sides of the neutral position. In a first working position, the membrane is curved away from the cavity so that the volume of the cavity is enlarged relative to the volume wherein the membrane is located in the neutral position. In a second working position, the membrane is curved towards the cavity so that the volume of the cavity is reduced relative to the volume wherein the membrane is located in the neutral position. In order to alter the gas pressure in the cavity and to adjust the membrane from one working position to the other working position, the actuator has a tempering device that is heat-conductively connected to the working medium. The working medium can be heated or cooled by means of the tempering device. The membrane is drive-connected to a valve element moveable between an open position and a closed position, which is arranged in a flow channel and blocks or permits the flow-through of a flow medium located in the flow channel. When the working medium has an over pressure and the membrane is bowed away from the cavity, the valve element is opened. When the pressure in the working medium is the same as the ambient pressure, the membrane is in the neutral position and the valve element is closed. A disadvantage resides in the actuator in that the latter continuously consumes energy in at least one of the two working positions. At certain ambient temperatures it may even become necessary to heat the working medium when the valve element is in the open position and to cool it when the valve element is in the closed position in order to ensure that the valve opens and closes properly. In this case the actuator must be continuously supplied with energy in both working positions of the valve element.

The object of the invention is therefore to create an actuator of the aforesaid type which permits low energy consumption but which can nevertheless be reliably maintained in the respective working position. The object furthermore consists of providing a method for producing such an actuator.

SUMMARY OF THE INVENTION

This object is achieved for the actuator by the membrane being compressively preloaded or tensioned in the neutral position in such a way that it always maintains its position in both working positions if no sufficiently large force impacts the membrane to cause a change in the position.

According to the invention, the membrane is thus compressively pre-loaded or tensioned in such a way that it exhibits a bistable behavior in which it always maintains its position and its geometric shape in both working positions without energy from outside having to be supplied to the actuator. A sufficiently large pre-loading of the membrane is selected such that the mechanical energy stored in the membrane in both working positions always has a local minimum. Hence the membrane is pre-loaded such that the strain energy of the uncurved membrane in the neutral position is greater than the strain energy of the bowed membrane in the working position. In the neutral position, the membrane has a local maximum of mechanical energy. The neutral position is thus rendered unstable.

Energy is only needed to move the membrane from one working position to the other working position. To do so the local maximum of mechanical energy in the neutral position must be overcome. In the deflection of the membrane from one working position to the other working position, the mechanical energy stored in the membrane initially increases (from a first minimum allocated to the first-mentioned working position) until a maximum is attained, and then decreases in another deflection of the membrane until a second minimum allocated to the other working position is attained. In an advantageous manner, owing to the compressive pre-loading of the membrane only a small amount of energy is needed for operating the actuator, particularly when the actuator is predominantly being operated in the working positions. The energy needed for overcoming the maximum in the neutral position can be provided by a pressure acting perpendicular to the membrane plane, which can be generated by expansion or compression of the working medium.

In an advantageous embodiment of the invention, the actuator comprises a layered structure with several structural layers arranged on top of one another, wherein a first structural layer is formed by the tempering device and a second structural layer is formed by a substrate plate comprising the membrane, and wherein a third structural layer is configured as a thermal insulation layer arranged between the first structural layer and the second structural layer. The substrate plate is then thermally decoupled from the tempering device by the insulation layer, which permits rapid heating up or cooling down of the working medium and hence a rapid switching of the membrane from one working position to the other working position. The configuration of the actuator as a layered structure furthermore permits a simplified and economical production of the actuator with known semiconductor manufacturing processes.

Preference is given to the tempering device comprising at least one Peltier element. It is thus possible to energize the Peltier element in both directions, depending on whether the working medium is to be heated and thus expanded or cooled and thus compressed. Furthermore, a reliable switching between the working positions at high and at low ambient temperatures is always ensured by this means.

In an advantageous embodiment of the invention, the tempering device has a heating device that preferably comprises an electric heating resistor. Optionally, such a heating resistor can also be present in addition to a Peltier element, whereby the energy consumption of the tempering device for heating the working medium can be reduced.

The heating resistor is expediently applied as a coating on a surface of the Peltier element that is heat-conductively connected to the working medium. A compact and economical construction of the actuator is thus possible.

In another advantageous embodiment of the invention, the membrane has an actuation device with at least two membrane layers stacked on top of one another perpendicular to its extension plane, wherein the membrane layers have different linear expansion coefficients and are preferably firmly bonded to one another, and wherein the actuator comprises, in addition to the first tempering device, a second tempering device by means of which at least one membrane layer can be tempered in order to deflect the membrane. Hence the energy needed to overcome the energy maximum residing in the neutral position of the membrane can also be applied by a tensioned layer. With the second tempering device switched off, by actuating the first tempering device the membrane can be moved from a first working position to a second working position, and with the first tempering device switched off, moved from the second working position to the first working position by actuating the second tempering device. It is thus possible to position the membrane selectively or alternatingly in both working positions without actively cooling the working medium.

Preference is given to the second tempering device having a heating resistor layer that is formed from at least one of the membrane layers and/or is heat-conductively connected to the membrane layers. The temperature of the membrane layers can then be easily set by suitably energizing the heating resistor layer.

It is advantageous if the heating resistor layer is spaced apart from the cavity, and if the membrane comprises a thermal insulation layer between the heating resistor layer and a membrane layer bordering the cavity, which connects the heating resistor layer to the membrane layer bordering the cavity. This gives rise to a simplified construction of the actuator in which the heating resistor layer is thermally insulated from the working medium.

In an advantageous embodiment of the invention, the thermal insulation layer comprises several support elements laterally spaced apart from each other, which in each case are connected by a first end region to the heating resistor layer and by a second end region spaced apart therefrom to the membrane layer bordering the cavity, wherein the thermal insulation layer comprises at least one hollow space between the support elements. The at least one hollow space ensures good thermal insulation between the heating resistor layer and the working medium.

It is advantageous if the support elements are pivot-connected via hinged areas to the heating resistor layer and/or to the membrane layer bordering the cavity. The membrane is then more easily moved between the working positions. Preference is given to configuration of the hinged areas as solid state hinges. The latter may have a smaller cross-section than the support elements.

Preference is given to the support elements being composed of a thermally insulating material. An even better thermal decoupling of the membrane layers is thus achievable.

In a development of the invention, provision is made for the heating resistor layer to have a larger electrically conductive cross-section in places that are adjacent to the support elements than in places that are spaced further apart from the support elements. With a current flow, the electrical resistance and thus the heat load in the heating resistor layer is then reduced in relation to the areas adjacent to the support elements so that even less heat is transferred via the support elements to the membrane layer bordering the cavity when the heating resistor layer is in use.

Preference is given to the actuator of the invention being part of a relay that has at least two electric contacts moveable between an open position and a closed position, wherein at least one of said contacts is drive-connected to the actuator.

The actuator, however, can also be part of an optical switch comprising at least one optically acting element that is drive-connected to the actuator and moveable between a first switch position and a second switch position, wherein the optical switch has an optical transmitter, an optical receiver allocated thereto, and a beam path located between the transmitter and the receiver, and wherein the optical element is aligned in the beam path in the first switch position and outside the beam path in the second switch position. The optical element can be, for example, a baffle that interrupts the beam path in the first switch position and unblocks the beam path in the second switch position. It is also possible, however, for the optical element to be configured as a deflector, a filter, and/or a polarizer.

The actuator of the invention can also be part of a microvalve that has at least one valve component that is drive-connected to the actuator, moveable between an open position and a closed position, and arranged in a flow channel. The valve component can also be formed by the membrane itself. In a microvalve, the lateral dimensions of the membrane typically measure between 1.5 and 5 millimeters. The membrane stroke typically measures approximately 20 to 100 µm.

The aforementioned object is achieved for the method wherein provision is made of a substrate plate on which a tensioning layer is attached in such a way that the substrate plate, in its plane of extension, is expanded and the tensioning layer is compressed, wherein side-delimiting walls for a cavity are attached to the tensioning layer, wherein a wall of a tempering device is positioned on the side-delimiting walls in such a way that the wall covers the cavity, wherein the wall is connected to the side-delimiting walls in a bonding step, wherein for producing a membrane on the backside of a subarea of the substrate plate overlapping the cavity and facing away from the cavity and separated from the edge of the cavity, material is removed in such a way that the wall thickness of the substrate plate in the membrane area is less than in an area of the substrate plate delimiting the membrane and the membrane is compressively pre-loaded or tensioned under the formation of a curve, wherein the cavity is inflated with a working medium that alters its volume and/or its gas pressure when a temperature change occurs, and wherein the cavity is hermetically sealed afterwards.

The wall thicknesses of the membrane are adapted to the compression stress exerted on the membrane by the tensioning layer in such a way that the membrane bows during the removal of the material and is deflected perpendicular to the plane of extension of the substrate membrane from a neutral position. The membrane is thus compressively pre-loaded or tensioned in such a way that a curve is formed out of the plane.

It is advantageous if positioning elements are attached to the tensioning layer and/or to the side-delimiting walls, and if the wall of the tempering device is form-fittingly inserted between the positioning elements. After being positioned on the side-delimiting walls, the wall of the tempering device is then secured against lateral displacement relative to the substrate plate by the positioning elements.

BRIEF DESCRIPTION OF THE DRAWINGS

Illustrative embodiments of the invention are explained in more detail in the following, with reference to the drawing. Shown are.

DETAILED DESCRIPTION OF THE PREFERRED EMBODIMENTS

Figure 1:
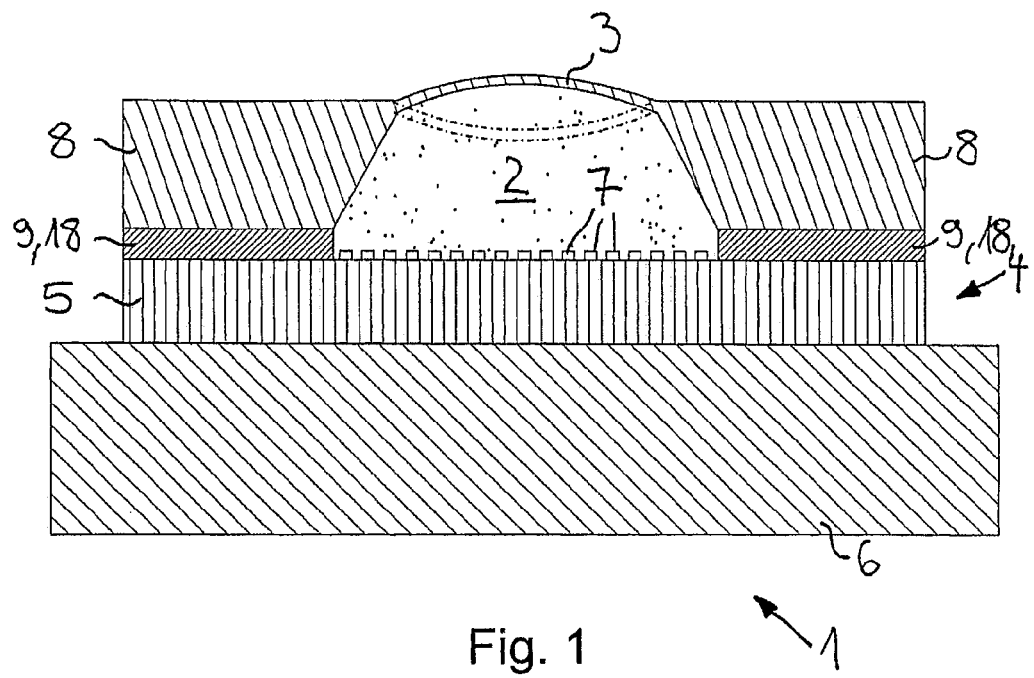
FIG. 1 a cross-section through a first illustrative embodiment of a thermo-pneumatic actuator, which comprises a cavity that is inflated with a working medium, FIG. 2 a graphic representation of the electric control voltage on a Peltier element of the actuator provided for tempering the working medium as well as of the membrane deflection, wherein the time t is plotted on the abscissa and the membrane deflection x is plotted on the left-hand ordinate and the control voltage is plotted on the right-hand ordinate, FIG. 3. a cross-section through a second illustrative embodiment of the thermo-pneumatic actuator, FIG. 4 an enlarged section from FIG. 3, on which a membrane can be discerned, FIG. 5 a view from above of a resistor element of a heating resistor layer of the membrane, FIGS. 6A through 6F cross-sections through a substrate plate on which the actuator is produced during the individual steps of a manufacturing process, FIG. 7 a cross-section through a micromechanical valve, in which the valve is in the open position, FIG. 8 an illustration similar to that of FIG. 7, but with the valve in the closed position, FIG. 9 a cross-section through a micromechanical relay, and FIG. 10 a cross-section through an optical switch.

A thermo-pneumatic actuator designated in its entirety by 1 in FIG. 1 comprises a cavity 2 delimited by walls, which is hermetically sealed and inflated with a working medium. The working medium can be a gas (e.g., air) or a liquid that expands its volume as it is volatilized. The working medium can also be a mixture of a gas and such a liquid. The gas pressure of the working medium is temperature-dependent and increases as the temperature rises.

A wall area of the cavity 2 is configured as a ductile membrane 3, which can be moved from a neutral position, in which the membrane is more or less aligned in a plane, to a first working position represented by dashed lines in FIG. 1 and to a second working position represented by solid lines in FIG. 1. In the first working position the membrane 3 is curved in a first direction towards the cavity 2 and in the second working position it is curved in a second direction opposite the first direction. It can be clearly discerned that the deflection of the membrane 3 in both working positions in each case increases from the edge of the membrane 3 to the middle thereof and then decreases towards the opposite edge of the membrane 3. The deflection is defined as the distance of the membrane 3 at the given point to a plane located approximately midway between the two working positions, measured in a direction running perpendicular to this plane.

For tempering the working medium, the actuator has a tempering device 4, which includes a cooling and a heating device according to the illustrative embodiment shown in FIG. 1. The cooling device has a Peltier element 5, which is only illustrated schematically in the drawing and which comprises, between two substrate plates, a plurality of semiconductor arrangements located adjacently to each other which in each case have two semiconductors that possess a different energy level. The semiconductors are connected to one another via contact surfaces. The semiconductor arrangements are electrically connected in series and connected to a power supply, which is not shown in any greater detail in the drawing. A first contact surface facing the cavity 2 and a second contact surface facing away from the cavity 2 of each semiconductor arrangement are in each case heat-conductively connected in planar fashion to the working medium and to a heat sink 6, respectively. The semi-conductor arrangements are mechanically connected in parallel.

For cooling the working medium, the Peltier element 5 is energized in such a way that the cool side of the Peltier element 5 faces the cavity 2 and the hot side faces the heat sink 6, so that heat energy is extracted from the working medium and fed into the heat sink 6. As a result, the gas pressure in the cavity drops, attaining a value less than the ambient pressure of the actuator 1 and causing the membrane to curve inward towards the cavity. If necessary the working medium can also be heated with the Peltier element 5 by reversing the current flow.

It can be discerned in FIG. 1 that the heating device comprises an electric heating resistor 7, which is applied as a coating on the surface of the Peltier element 5 facing the cavity 2. The heating resistor 7 comprises several side-by-side running resistance tracks, which are connected in series and border the working medium. The heating resistor 7 is connected to a power supply not shown in any greater detail, by means of which the heating resistor 7 can be energized for heating the working medium. As a result, the gas pressure in the cavity rises, attaining a value greater than the ambient pressure of the actuator 1 and causing the membrane to curve outward away from the cavity.

In the neutral position the membrane 3 is compressively pre-loaded in its extension plane in such a way that the membrane 3 is bistable and in each case maintains its position in the first working position as well as in the second working position if no or only a weak outside force impacts the membrane 3 perpendicular to its plane of extension. After the positioning of the membrane 3 in the respective working position, it is thus possible to switch off the tempering device 4 without the membrane being appreciably deflected from the working position. With increasing deflection of the membrane 3, the compressive stress induced in the membrane 3 by the tensioning diminishes on either side of the neutral position.

In FIG. 1 it can still be discerned that the Peltier element 5 and the heating resistor 7 are spaced apart from the membrane 3 by the cavity 2, i.e., the Peltier element 5 or the heating resistor 7 and the membrane 3 are each arranged on opposite sides of the cavity 2.

It can furthermore be discerned that the actuator 1 comprises a layered structure with several structural layers arranged on top of one another. A first structural layer is formed by the tempering device 4 and a second structural layer is formed by a substrate plate 8 comprising the membrane 3. The wall thickness of the substrate plate 8 is reduced in the area of the membrane 3. To this end, the substrate plate 8 has a recess on a backside facing the tempering device 4. A third structural layer is configured as a thermal insulation layer 9. The latter is arranged between the tempering device 4 and the substrate plate 8 in order to thermally decouple the substrate plate 8 from the tempering device 4.

Figure 2:
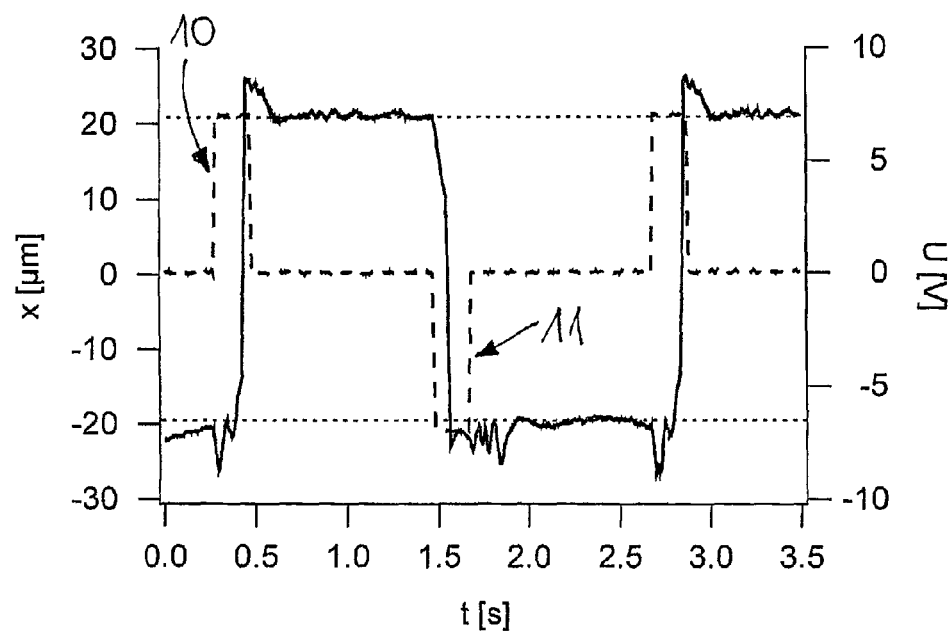

It can be discerned in FIG. 2 that the membrane 3 located in the first working position is deflected almost instantaneously away from the cavity 2 into the second working position after a heating pulse 10 is applied to the Peltier element 5, and that the second working position is essentially maintained even after termination of the heating pulse 10. Analogously, the membrane 3 is deflected almost instantaneously towards the cavity 2 after the emission of a cooling pulse 11 to the Peltier element 5, until it attains the first working position. The first working position is essentially maintained after termination of the cooling pulse 11.

Figure 3:
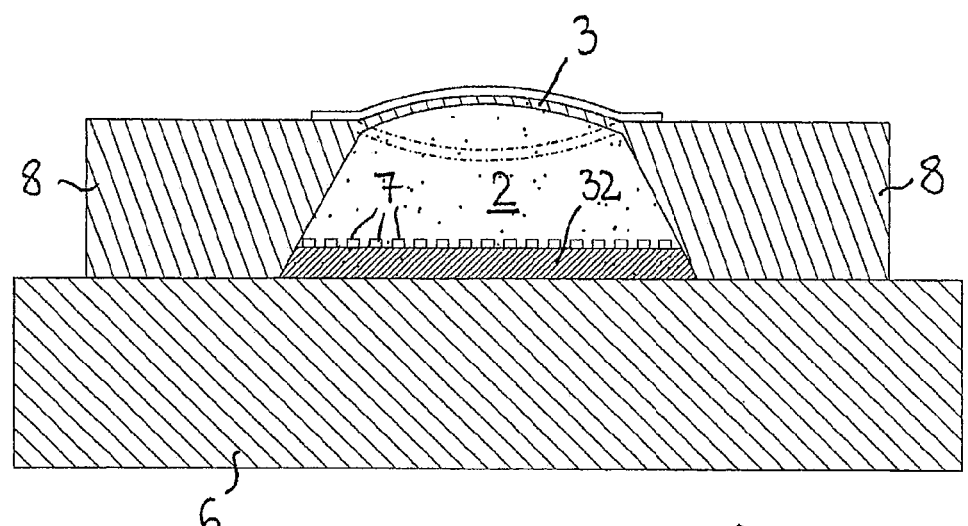
Figure 4:
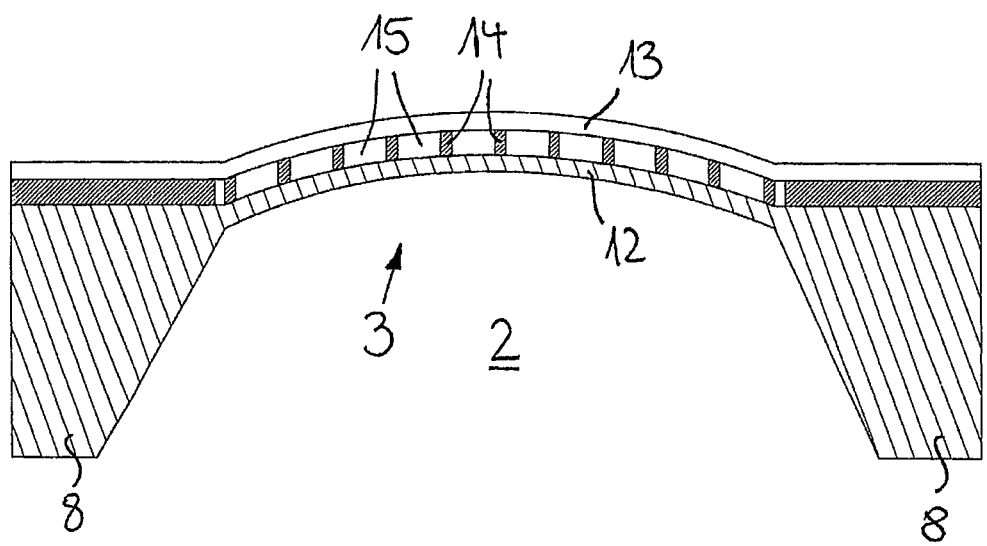
Figure 5:
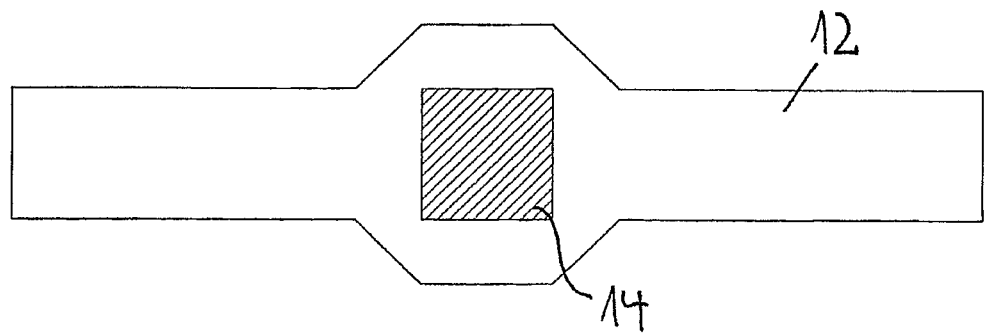

The Peltier element is dispensed with in the illustrative embodiment shown in FIGS. 3 through 5. On the heat sink 6 beneath the cavity 2 is arranged a thermal insulation layer 32, on whose surface facing the cavity 2 is mounted the heating resistor 7. In contrast to the illustrative embodiment shown in FIG. 1, there is no thermal insulation layer arranged between the substrate plate 8 and the heat sink 6, thus heat can be efficiently conducted from the substrate plate 8 to the heat sink 6.

The membrane 3 has an actuation mechanism comprising two membrane layers 12, 13 stacked on top of one another perpendicular to the extension plane of the membrane 3. The membrane layers 12, 13 have different linear expansion coefficients and are firmly bonded to one another via a thermal insulation layer. A first membrane layer 12 borders the cavity 2 and a second membrane layer 13 is spaced apart from the cavity 2.

The second membrane layer 13 is electrically conductive and configured as a heating resistor layer, which can be connected to a power supply (not shown in any greater detail in the drawing) in order to heat it. When the temperature in the second membrane layer 13 rises, the membrane layers 12, 13 press against each other, thus deflecting the membrane 3 towards the cavity 2.

The thermal insulation layer is arranged between the first membrane layer 12 and the second membrane layer 13 and comprises several columnar support elements 14, which are laterally spaced apart from each other and aligned perpendicular to the surface in which the membrane 3 extends. The support elements 14 are laterally spaced apart from each other and in each case are connected by a first end region to the first membrane layer 12 and by a second end region spaced apart therefrom to the second membrane layer 13. Between the support elements 14 is formed a hollow space 15, which thermally insulates the second membrane layer 13 from the working medium located in the cavity 2. The support elements 14 are composed of a thermally insulating material and are in each case connected at the first end region by a first solid state hinge to the first membrane layer 12 and at the second end region by a second solid state hinge to the second membrane layer 13.

The heating resistor layer has several track-shaped resistor elements which overlap the hollow space 15 and the support elements 14 and which are laterally spaced apart from one another. In FIG. 5 it can be discerned that the resistor elements formed by the heating resistor layer have a larger electrically conductive cross-section in places that are arranged adjacent to the support elements 14, and particularly as a straight lengthening of the support elements 14, than in places that are spaced further apart from the support elements 14. This is achieved by the resistor elements at the first-mentioned places being wider than at places that are further away from the support elements 14. The current flowing through the resistor elements thus heats the resistor elements less intensively at the places that are adjacent to the support elements 14 than at the places that are spaced further apart from the support elements 14. The heat input in the support places and consequently in the first membrane layer 12 is thus reduced as the second membrane layer 13 is heated. This measure simultaneously serves to reduce the transfer of heat from the working medium to the second membrane layer 13 as the working medium is heated with the heating resistor 7.

Figure 6A:
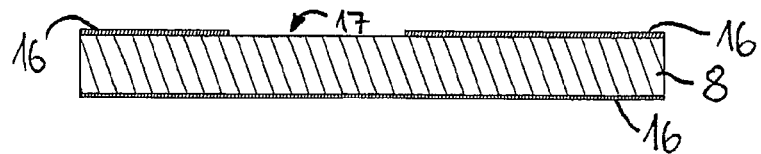
Figure 6B:
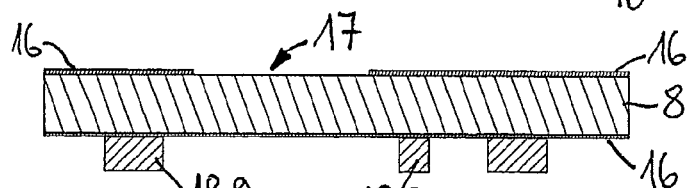

For manufacturing the actuator 1, provision is initially made of a substrate plate 8 on which a tensioning layer 16 is applied on both sides in such a way that a compressive stress is applied to the tensioning layer 16 and a tensile stress is applied to the substrate plate 8, which expands the substrate plate 8 in its plane of extension (FIG. 6A). The compressive and/or the tensile stress is generated with the deposition of the tensioning layer 16 on the substrate plate 8 because the material of the tensioning layer 16 has a greater crystal spacing than that of the material of the substrate plate 8. The layer tensions can also be induced by different thermal expansion coefficients and a deposition temperature higher than the temperature of the substrate plate 8. Process-linked contaminations can also induce the layer tensions.

Preference is given to the selection of monocrystalline silicon as a material for the substrate plate 8 and silicon dioxide as a material for the tensioning layer 16. The invention is not limited to these materials, however. Other materials with which compressive layer stresses are induced in the membrane 3 for at least one of the aforementioned reasons are also possible.

On the backside of the substrate plate 8, the tensioning layer 16 comprises, in a substrate area in which substrate material will be removed in a later process step, an opening 17 spaced apart from the edge of the substrate plate 8.

Figure 6C:
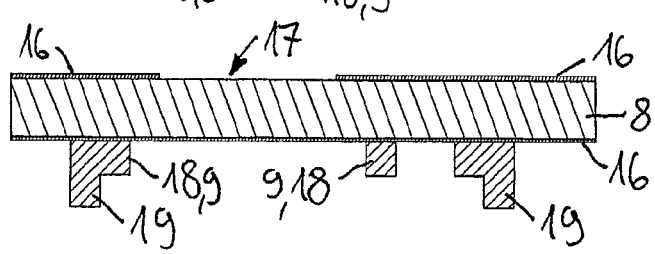
Figure 6D:
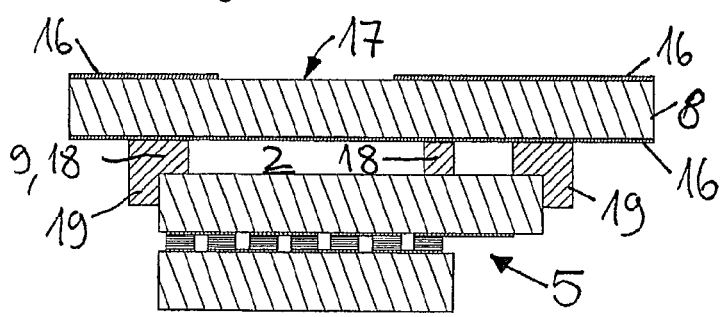
Figure 6E:
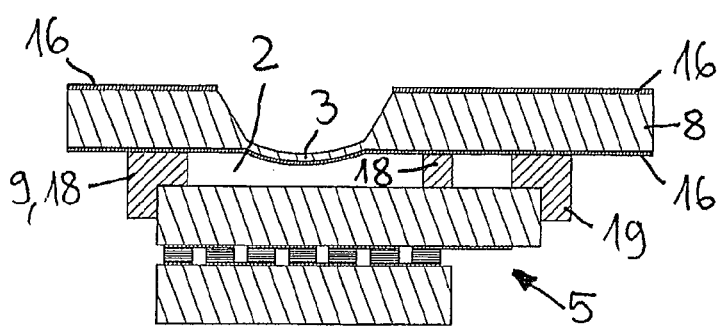

On the front side of the substrate plate 8, side-delimiting walls 18 for a cavity 2 are now photolithographically attached to the tensioning layer 17 (FIG. 6C). Preference is given to the side-delimiting walls 18 being composed of a permanent photoresist. In FIG. 6D it can be discerned that positioning elements 19 are photolithographically attached to the side-delimiting walls 18 and the substrate plate 8.

In another process step illustrated in FIG. 6D, a temperable wall of a Peltier element 5 is positioned on the side-delimiting walls 18 in such a way that said wall covers the cavity 2. The Peltier element 5 thus comes in abutment on the positioning elements 19 in such a way that it is form-fittingly secured between the positioning elements 19. The wall of the Peltier element 5 is then connected in a bonding step to the side-delimiting walls 18 and/or the positioning elements 19.

For producing a membrane 3 that is integrally connected to the substrate plate 8 at the opening 17, material is removed from the substrate plate 8 in order to reduce the wall thickness of the substrate plate 8. Owing to the tensioning of the substrate plate 8, the membrane 3 elastically curves away from the cavity 2.

Figure 6F:
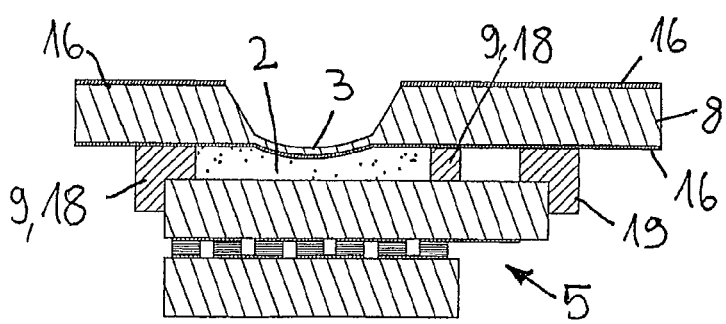

The cavity 2 is then inflated via at least one channel (not shown in any greater detail in the drawing) with a working medium, which alters its volume and/or its gas pressure when a temperature change occurs (FIG. 6F). The at least one channel is then sealed with, for example, an epoxy resin, in order to hermetically seal the cavity 2 and to enclose the working medium in the cavity 2.

Figure 7:
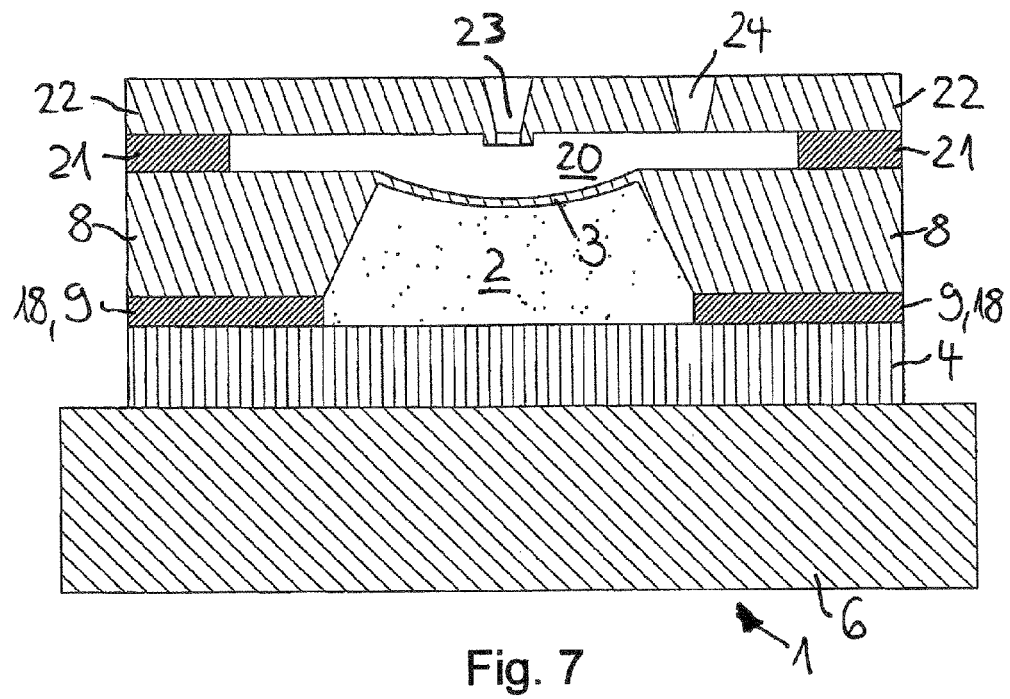
Figure 8:
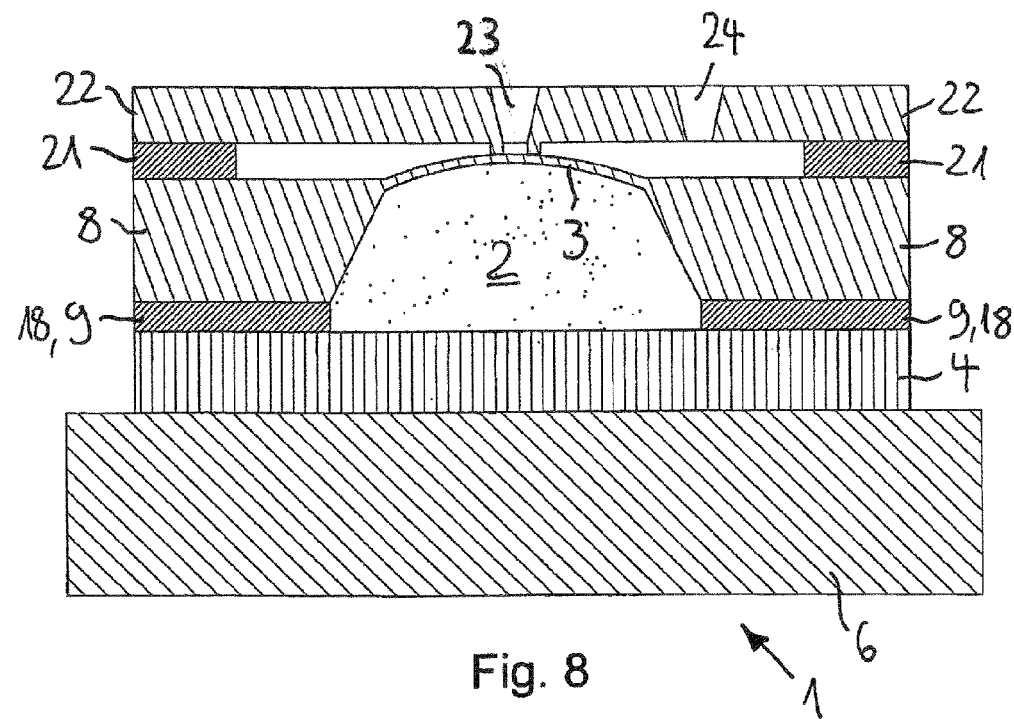

In FIGS. 7 and 8 it can be discerned that the actuator 1 can be part of a microvalve comprising a flow channel 20 for a flowable medium. The flow channel 20 is formed between the substrate plate 8 and another plate 22 mounted on but spaced apart from the substrate plate by a spacer layer 21.

A valve opening 23 and another opening 24 are arranged behind one another in the flow channel 20. The valve opening 23 is located opposite the membrane 3. The latter is moveable towards and away from the valve opening 23. In an open position (FIG. 7), the membrane 3 is spaced apart from the valve opening 23, whereas in a closed position (FIG. 8) the membrane 3 abuts against the valve opening 23 and seals it off from the flowable medium.

Figure 9:
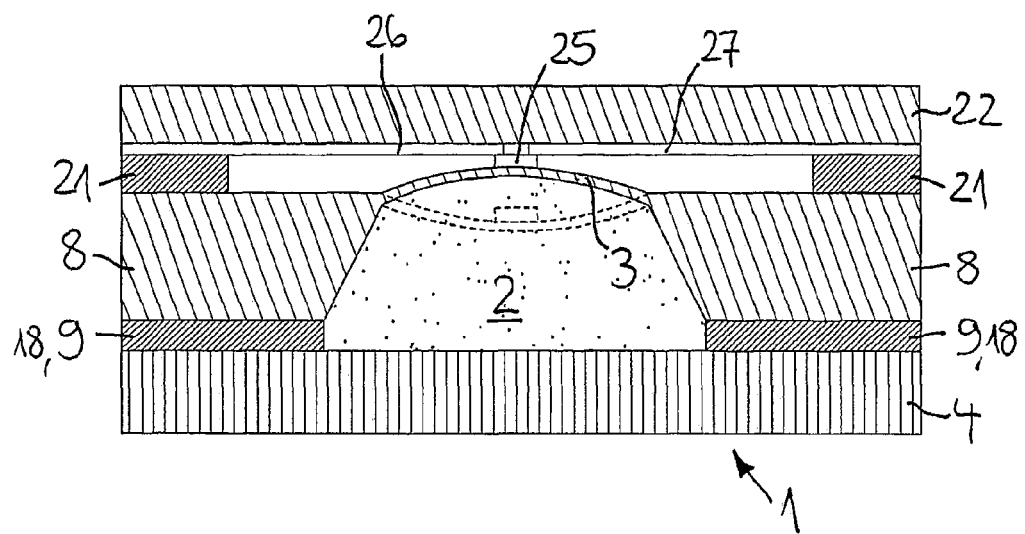

In FIG. 9 it can be discerned that the actuator 1 can also be a relay component. The relay comprises three electric contacts moveable between an open position and a closed position. A first contact 25 is arranged on the side of the membrane 3 facing away from the cavity 2 approximately midway thereto and connected to the membrane 3. Two second contacts 26, 27 are arranged on another plate 22 spaced apart from the substrate plate 8 by a spacer layer 21, with lateral distance to one another and facing the first contact 25. The first contact 25 together with the membrane 3 is moveable towards and away from the second contacts 26, 27. In the open position indicated by dashed lines in FIG. 9, the first contact 25 is spaced apart from the second contacts 26, 27, and in the closed position the first contact 25 comes in abutment with both second contacts 26, 27 so that the latter are bridged and electrically connected to one another.

Figure 10:
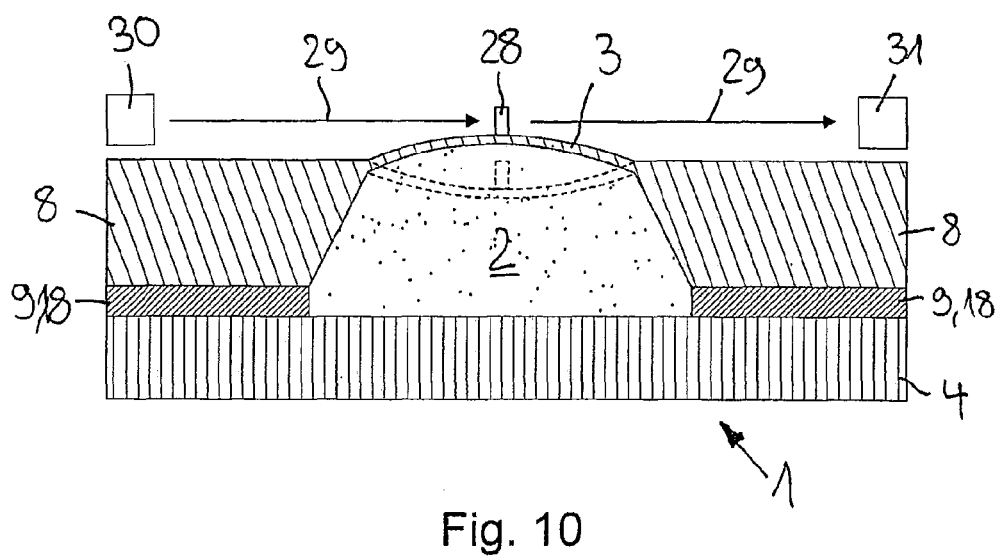

In FIG. 10 it can be discerned that the actuator 1 can also be part of an optical switch. The switch has an optically acting element 28 that is arranged on the side of the membrane 3 facing away from the cavity 2 approximately midway thereto and connected to the membrane 3. By means of the actuator 1, the optically acting element 28 is moveable between a first and a second switch position. In the first switch position the element 28 is positioned within a beam path 29, which is formed between an optical transmitter 29 and an optical receiver 30 cooperating therewith. In the first switch position the beam path is interrupted by the element 28. In the second switch position indicated in dashed lines in FIG. 10, the element 28 is positioned outside the beam path 29 so that a beam emitted by a transmitter 29 can be detected with the receiver 30.

The invention claimed is:

1. A thermo-pneumatic actuator comprising:
a hermetically sealed cavity delimited by walls, which is inflated with a working medium that alters its gas pressure when a temperature change occurs, wherein a wall area of the cavity is configured as a ductile membrane that can be deflected in at least two working positions located on either side of a neutral position in which the ductile membrane is curved in opposite directions to one another, the ductile membrane further comprising an actuation device with at least two membrane layers stacked on top of one another perpendicular to its plane of extension, the membrane layers having different linear expansion coefficients and firmly bonded to one another, the ductile membrane in the neutral position being compressively pre-loaded or tensioned in such a way that it always maintains its position in both working positions if no outside force impacts the ductile membrane, and further comprising a first tempering device that is heat-conductively connected to the working medium for altering the gas pressure in the cavity and for adjusting the ductile membrane from one working position to the other working position, wherein the actuator comprises, in addition to the first tempering device, a second tempering device comprising a heating resistor layer, which is formed by at least one of the membrane layers of the actuation device and/or which is heat-conductively connected to one of the membrane layers, by means of which at least one of the membrane layers can be tempered in order to deflect the ductile membrane, and further wherein the ductile membrane comprises, between the heating resistor layer and the membrane layers bordering the cavity, a thermal insulation layer that connects the heating resistor layer to the membrane layers bordering the cavity, the thermal insulation layer having several support elements laterally spaced apart from one another, which in each case are connected by a first end region to the heating resistor layer and by a second end region spaced apart therefrom to the membrane layers bordering the cavity, and further wherein the heating resistor layer has a larger electrically conductive cross section in places that are adjacent to the support elements than in places that are spaced farther apart from the support elements.

2. The thermo-pneumatic actuator as in claim 1, wherein the actuator has a layered structure with several structural layers arranged on top of one another, further wherein a first structural layer is formed by the tempering device and a second structural layer is formed by a substrate plate comprising the ductile membrane, and still further characterized in that a third structural layer is configured as a thermal insulation layer arranged between the first structural layer and the second structural layer.

3. The thermo-pneumatic actuator as in claim 1, wherein the tempering device comprises at least one Peltier element.

4. The thermo-pneumatic actuator as in claim 1, wherein the tempering device has a heating device that preferably comprises an electric heating resistor.

5. The thermo-pneumatic actuator as in claim 3, wherein a heating resistor is applied as a coating on a surface of the at least one Peltier element that is heat-conductively connected to the working medium.

6. The thermo-pneumatic actuator as in claim 1, wherein the thermal insulation layer comprises several support elements laterally spaced apart from one another, which in each case are connected by a first end region to the heating resistor layer and by a second end region spaced apart therefrom to the membrane layer bordering the cavity, and further wherein the thermal insulation layer comprises at least one hollow space between the support elements.

7. The thermo-pneumatic actuator as in claim 6, wherein the support elements are pivot-connected via hinged areas to the heating resistor layer and/or to the membrane layers bordering the cavity.

8. The thermo-pneumatic actuator as in claim 6, wherein the support elements are composed of a thermally insulating material.

9. A relay with a thermo-electric actuator as in claim 1 and at least two electric contacts moveable between an open position and a closed position, of which at least one is drive-connected to the actuator.

10. An optical switch with a thermo-electric actuator as in claim 1, as well as with at least one optically acting element, which is drive-connected to the actuator and moveable between a first switch position and a second switch position, with an optical transmitter, an optical receiver allocated thereto, and a beam path located between the transmitter and the receiver, wherein the optical element is aligned in the beam path in the first switch position and outside the beam path in the second switch position.

11. A microvalve with a thermo-electric actuator as in claim 1 and at least one valve component that is drive-connected thereto, moveable between an open position and a closed position, and arranged in a flow channel.

* * * * *